US008862387B2

(12) United States Patent
Kandangath et al.

(10) Patent No.: US 8,862,387 B2
(45) Date of Patent: Oct. 14, 2014

(54) DYNAMIC PRESENTATION OF NAVIGATION INSTRUCTIONS

(71) Applicant: Apple Inc., Cupertino, CA (US)

(72) Inventors: Anil K. Kandangath, Santa Clara, CA (US); Xiaoyuan Tu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 13/736,741

(22) Filed: Jan. 8, 2013

(65) Prior Publication Data

US 2014/0195143 A1 Jul. 10, 2014

(51) Int. Cl.
*G01C 21/00* (2006.01)
*G01C 21/36* (2006.01)

(52) U.S. Cl.
CPC ................................. *G01C 21/3629* (2013.01)
USPC ............................ 701/419; 701/428; 701/431

(58) Field of Classification Search
USPC .............. 701/23, 25–28, 400, 409–410, 419, 701/423, 431; 340/995.2, 995.23
See application file for complete search history.

(56) References Cited

U.S. PATENT DOCUMENTS

| 4,679,147 | A | * | 7/1987 | Tsujii et al. | 701/443 |
| 4,937,751 | A | * | 6/1990 | Nimura et al. | 701/410 |
| 5,172,321 | A | * | 12/1992 | Ghaem et al. | 455/456.5 |
| 5,177,685 | A | * | 1/1993 | Davis et al. | 455/456.5 |
| 5,406,492 | A | * | 4/1995 | Suzuki | 701/428 |
| 6,298,305 | B1 | * | 10/2001 | Kadaba et al. | 701/428 |
| 2005/0195992 | A1 | * | 9/2005 | Kiuchi | 381/96 |

* cited by examiner

*Primary Examiner* — Yonel Beaulieu
(74) *Attorney, Agent, or Firm* — Fish & Richardson P.C.

(57) ABSTRACT

In some implementations, a mobile device can be configured to provide navigation instructions to a user of the mobile device. The navigation instructions can be graphical, textual or audio instructions. The presentation of the navigation instructions can be dynamically adjusted based the importance of individual instructions and/or environmental conditions. For example, each navigation instruction can be associated with an importance value indicating how important the instruction is. The volume of important audio instructions can be adjusted (e.g., increased) to compensate for ambient noise so that a user will be more likely to hear the navigation instruction. The timing and/or repetition of the presentation of important instructions can be adjusted based on weather conditions, traffic conditions, or road conditions and/or road features so that a user will be less likely to miss an important navigation instruction.

21 Claims, 7 Drawing Sheets

DYNAMIC PRESENTATION OF NAVIGATION INSTRUCTIONS

TECHNICAL FIELD

The disclosure generally relates to navigation technologies.

BACKGROUND

Modern mobile devices often provide navigation features that provide audio and/or visual directions to users of the mobile devices. A user can enter a start location and/or a destination location and the mobile device can provide text and/or audio (e.g., speech) instructions to the user directing the user from the start location to the destination location. However, sometimes the instructions can be difficult for the user to hear or understand based on environmental conditions, such as ambient noise, weather, traffic or other external influences.

SUMMARY

In some implementations, a mobile device can be configured to provide navigation instructions to a user of the mobile device. The navigation instructions can be graphical, textual or audio instructions. The presentation of the navigation instructions can be dynamically adjusted based the importance of individual instructions and/or environmental conditions. For example, each navigation instruction can be associated with an importance value indicating how important the instruction is. The volume of important audio instructions can be adjusted (e.g., increased) to compensate for ambient noise so that a user will be more likely to hear the navigation instruction. The timing and/or repetition of the presentation of important instructions can be adjusted based on weather conditions, traffic conditions, or road conditions and/or road features so that a user will be less likely to miss an important navigation instruction.

Particular implementations provide at least the following advantages: Users of the navigation system described herein will be less likely to miss important navigation instructions while navigating along a route. The user will incur fewer travel delays due to missed instructions (e.g., turns).

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radial buttons, checkboxes and any other mechanism for receiving input from, or providing feedback to a user.

The paragraphs below describe a system in terms of operations performed by client and server devices. However, an operation described as being performed by the server device can be performed by the navigation client and an operation described as being performed by the navigation client can be performed by the server device.

System Overview

Figure 1:
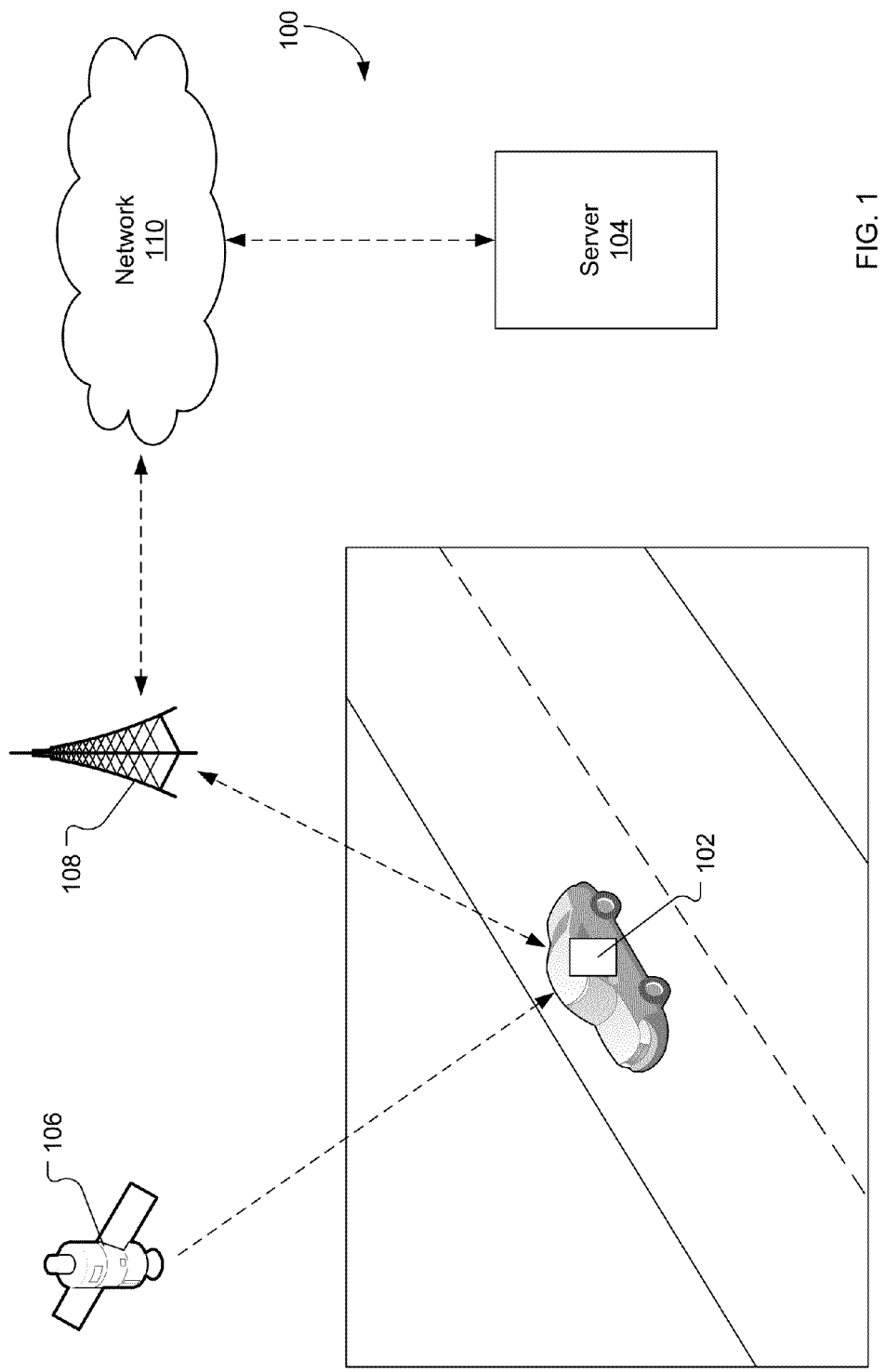
FIG. 1 illustrates an example system for providing navigation instructions to a user of a mobile device.

FIG. 1 illustrates an example system 100 for providing navigation instructions to a user of a mobile device. For example, a user can use mobile device 102 to request and receive navigation instructions from navigation server 104. Mobile device 102 can, for example, receive a starting location and/or a destination location as input from the user. Alternatively, mobile device 102 can receive signals from satellite 106 and/or radio access technology (RAT) transceiver 108 (e.g., CDMA, GSM, 4G, LTE radio access technologies) and determine the current location of mobile device 102 based on the received signals. The current location of mobile device 102 can be used as the starting location, for example. In some implementations, mobile device 102 can transmit the starting location and the destination location to navigation server 104. For example, mobile device can transmit the starting location and the destination location to navigation server 104 through RAT transceiver 108 (e.g., radio access network) and network 110 (e.g., the internet).

In some implementations, the navigation server 104 can determine routes and instructions (text and/or audio instructions) based on the starting location and the destination location transmitted from mobile device 102. In some implementations, navigation server 104 can determine the importance of each navigation instruction for a determined route. For example, each navigation instruction (e.g., a turn instruction, a continue instruction, a destination instruction, etc.) can be assigned an importance value. The importance value for each instruction can be configured or predefined. The importance value for each instruction can be determined dynamically based on the estimated travel delay incurred if the user were to miss the instruction. The importance value for each instruction can be determined dynamically based on commonly missed instructions as previously reported by other mobile devices. The importance value for an instruction can be determined based on whether the instruction relates to an unusual or unique road condition, for example. In some implementations, once the routing information (e.g., route or routes), navigation instructions and importance values for each instruction) is determined based on the received start location and the destination location, navigation server 104 can transmit the routing information to mobile device 102.

In some implementations, mobile device 102 can present the routing information to the user of mobile device 102. For example, mobile device 102 can present a GUI that allows the user to select a route. Mobile device 102 can present a GUI that provides routing instructions in a graphical (e.g., map and/or text) format. In some implementation, mobile device 102 can present audio navigation instructions to the user. For example, mobile device 102 can include a speech synthesizer that converts the text routing or navigation instructions into audible speech.

In some implementations, the presentation of the navigation instructions by mobile device 102 can be dynamically adjusted according to various environmental conditions. For example, mobile device 102 can be configured to detect ambient noise and adjust the volume of audio navigation instructions so that the user can hear the navigation instructions over the ambient noise. In some implementations, only important instructions (as determined by an associated importance value) will be adjusted to account for the various environmental conditions. In some implementations, mobile device 102 can be configured to adjust the number of times an instruction is presented or adjust how far in advance of a maneuver (e.g., turn, merge, etc.) that an instruction is given based on the importance of an instruction.

Figure 2:
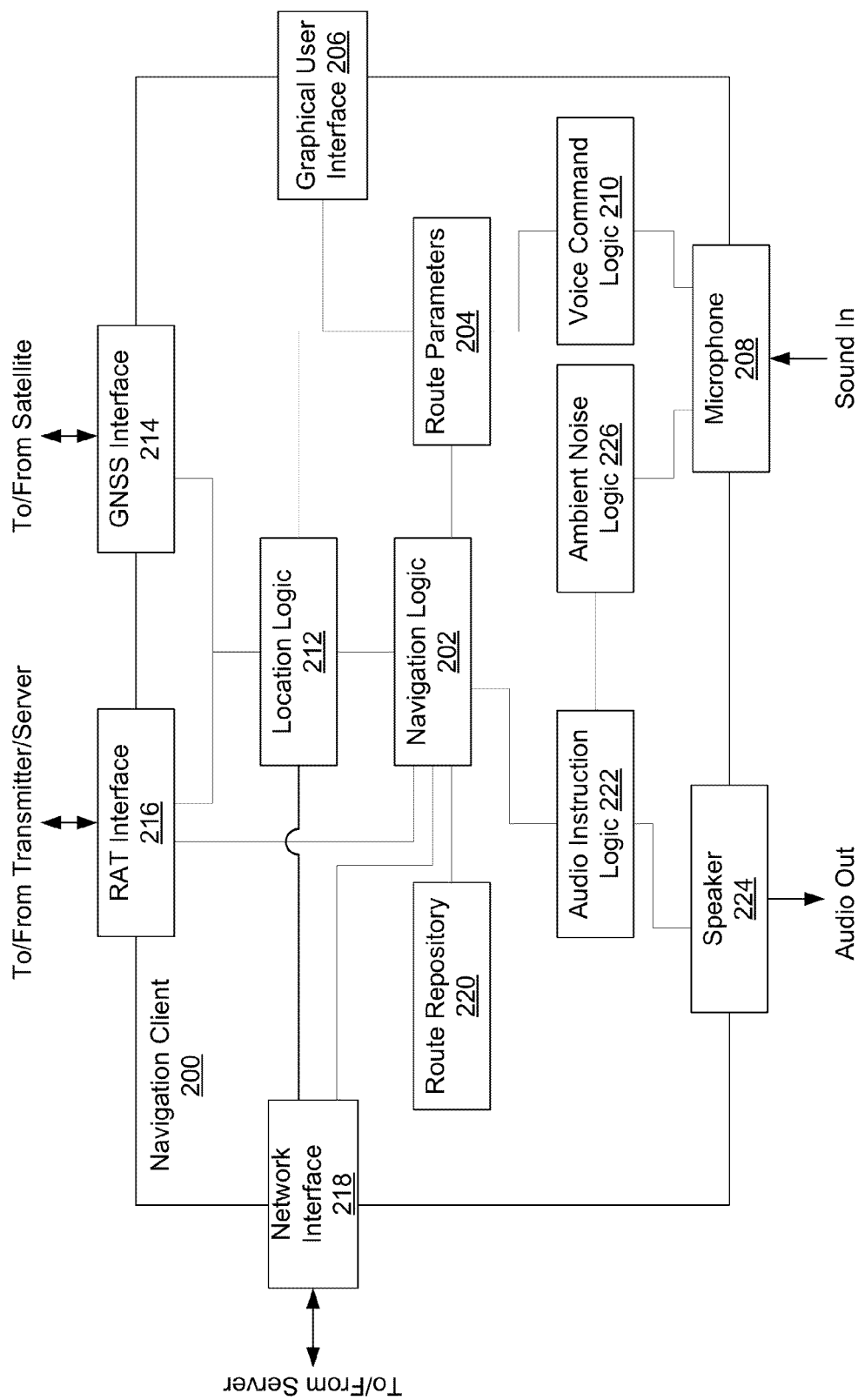
FIG. 2 illustrates an example navigation client for dynamic presentation of navigation instructions.

FIG. 2 illustrates an example navigation client 200 for dynamic presentation of navigation instructions. Navigation client can be implemented as hardware, software or a combination thereof. Navigation client 200 can be a laptop, smartphone, tablet device, or any other type of mobile computing device. For example, navigation client 200 can correspond to mobile device 102 of FIG. 1. In some implementations, navigation client 200 can include navigation logic 204. For example, navigation logic 202 can be configured to receive user-specified route parameters 204. Route parameters 204 can be specified by a user by providing input to graphical user interface 206. For example, the user can specify a start location and a destination location using graphical user interface 206. In some implementations, route parameters 204 (e.g., start location, destination location, etc.) can be specified by voice command. For example, navigation client 200 can include microphone 208 for receiving or detecting sounds corresponding to user speech and voice command logic 210 for interpreting the detected sounds and determining commands corresponding to the user's speech.

In some implementations, the user can specify that the current location of navigation client 200 is the start location. In some implementations, the current location of navigation client 200 can be determined by location logic 212. For example, location logic 212 can determine the current location of navigation client 200 based on signals received from satellites through GNSS (global navigation satellite system) interface 214. Location logic 212 can determine the current location of navigation client 200 based on signals received from RAT (radio access technology) transmitters, servers, and/or networks through RAT interface 216. Location logic 212 can determine the current location of navigation client 200 based on signals received from network devices (e.g., access points) through network interface 218, for example. For example, the location of navigation client 200 can be determined using known triangulation or trilateration techniques that use the known locations of transmitters (e.g., RAT cell towers, satellites, network access points, etc.) and data (e.g., timestamps) within signals broadcast by the transmitters. Once location logic 212 determines the current location of navigation client 200, location logic 212 can provide the current location as the start location for route parameters 204.

In some implementations, navigation logic 202 can transmit route parameters 204 to a navigation server (e.g., navigation server 104 of FIG. 1) that will determine one or more routes based on route parameters 204 (e.g., routes between the start location and the destination location). For example, navigation logic 202 can transmit route parameters 204 to the navigation server using network interface 218 (e.g., WiFi interface, Ethernet interface, etc.) or using RAT interface 216 (e.g., cellular data interface, CDMA, GSM, etc.).

In some implementations, navigation logic 202 can receive route information from the navigation server. For example, route information can be received over a network (e.g., the internet) through RAT interface 216 and/or network interface 218. The received route information can be stored in route repository 220, for example. The route information can include routes between the start location and the destination location. For example, each route can include a sequence of road segments upon which a user can travel to navigate between the start location and the destination location.

In some implementations, the route information can include navigation instructions. For example, the navigation instructions can describe how the user should navigate a route between the start location and the destination location. The navigation instructions can describe to the user how to transition or move from one road segment to another road segment. In some implementations, the navigation instructions can include text instructions. An example navigation instruction could be "turn right on $1^{st}$ Street" or "turn left in 500 feet" or "continue on Highway 101."

In some implementations, each navigation instruction can be associated with a navigation location along a corresponding route. For example, a turn instruction (e.g., "turn right on $1^{st}$ Street") can be associated with the intersection of $1^{st}$ Street and the road the user is travelling on (e.g., the location of the intersection where the user needs to turn). In some implementations, the navigation logic 202 can be configured to present each navigation instruction in advance of the navigation location associated with the navigation instruction. For example, navigation logic 202 can be configured to present a navigation instruction a specified (e.g., specified by the navigation server) distance (e.g., 500 ft, ½ mile, etc.) in advance (referred to herein as a 'location offset') of the user reaching the navigation location associated with the navigation instruction. In some implementations, the navigation server can specify multiple location offsets (e.g., ½ mile and 500 ft) for a navigation instruction. For example, when multiple location offsets are specified, navigation logic 202 can present the corresponding navigation instruction multiple times (e.g., present once at each location offset). Thus, the user will have multiple opportunities to hear an instruction and avoid missing the instruction.

In some implementations, each navigation instruction can have an associated importance value. For example, the navigation server can determine the importance of each navigation instruction according to criteria described below. The importance values can be included in the route information sent by the navigation server to navigation logic 202.

In some implementations, navigation logic 202 can present the received routes to the user using graphical user interface 206. For example, using graphical user interface 206, navigation logic 202 can allow the user to select a route for navigating from the start location to the destination location from among the routes received from the navigation server. Once the route is selected, the user can begin navigating the route and receiving navigation instructions. For example, the user can select a route and then provide user input indicating that navigation logic 202 should start presenting navigation instructions for the selected route to the user. Navigation logic 202 can then start presenting audio and/or visual navigation instructions for the selected route to the user.

In some implementations, navigation logic 202 can retrieve navigation instructions from route repository 220 and present the navigation instructions to the user. For example, navigation logic 202 can receive the current location of navigation client 200 from location logic 212, as described above. Navigation logic 202 can use the current location of navigation client 200 to determine which navigation instruction should be presented. For example, navigation logic 202 can compare the current location of navigation client 200 to navigation locations associated with navigation instructions to determine which navigation instruction to present and when (e.g., a specified by the location offset) to present the determined navigation instruction. Navigation logic 202 can then cause the navigation instruction to be presented when navigation client 200 reaches a location determined based on the navigation location and the specified location offset.

In some implementations, navigation instructions can be presented on graphical user interface 206. For example, navigation instructions can be presented graphically (e.g., arrows, lines, etc.) on a map interface. Navigation instructions can be presented as text on graphical user interface 206.

In some implementations, navigation instructions can be presented as audio instructions to the user. For example, navigation logic 202 can send textual navigation instructions to audio instruction logic 222. Audio instruction logic 222 can convert the textual navigation instructions into speech using known speech synthesis techniques. Once a textual navigation instruction is converted to speech, audio instruction logic 222 can present the speech audio instructions to the user through speaker 224. In some implementations, audio instructions are presented to the user using a predefined volume level.

In some implementations, the volume of audio instructions presented by navigation client 200 can be adjusted according to ambient noise detected by the navigation client 200. For example, ambient noise logic 226 can detect ambient noise using microphone 208. Ambient noise can include road noise, vehicle noise, music from a car stereo or people talking in the vicinity of navigation client 200, for example. Ambient noise logic 226 can receive signals corresponding to ambient noise detected by microphone 208 and determine the loudness (e.g., decibel level) of the ambient noise. In some implementations, ambient noise logic 226 can generate a metric representing the loudness of the ambient noise. For example, the loudness metric can correspond to an audio output volume level of the navigation client. The ambient noise logic 226 can provide the loudness metric to audio instruction logic 222 and audio instruction logic 222 can adjust the volume at which the audio navigation instructions are presented so that the volume of the audio instructions is greater than the loudness of the ambient noise. For example, the volume of the audio instructions can be adjusted so that a user can clearly hear the audio navigation instructions over the ambient noise.

In some implementations, only important audio navigation instructions will be volume adjusted based on detected ambient noise. For example, the volume of audio instructions having a high importance value can be adjusted to be louder than the ambient noise while the volume of audio navigation instructions that have a low or nominal importance value will not be adjusted.

In some implementations, important audio instructions can be repeated based on the importance of the audio instruction. For example, an audio instruction associated with a high importance value can be presented two or more times while audio instructions with low or nominal importance values may be presented only once. Navigation logic 202 can determine when to present repeated instructions based on the navigation location and the specified location offset. For example, for an important instruction, navigation logic 202 can determine that the audio navigation instruction be presented according to some multiple of the location offset (e.g., offset×1, offset×½, offset×2, etc.).

In some implementations, navigation logic can increase the location offset for an important instruction. For example, instead of or in addition to providing multiple instructions, navigation logic 202 can present an instruction to the user farther in advance of the navigation location (e.g., offset×2, offset×1½, etc.). Thus, by adjusting when and/or how (e.g., volume, frequency, distance) a navigation instruction is presented, navigation logic 202 can reduce the chances that a user will miss an important navigation instruction.

In some implementations, navigation logic 202 can determine when the user has missed an instruction. For example, navigation logic 202 can receive the current location of navigation client 200 from location logic 212. Navigation logic 202 can compare the current location of navigation client 200 to locations along a route that is currently being traversed by the user. If the current location of navigation client 200 is not a location along the current route, navigation logic 202 can determine that a navigation instruction has been missed. In some implementations, navigation logic 202 can cause audio instruction logic 222 to increase the volume for all audio navigation instructions when a missed instruction has been determined. For example, audio instruction logic can increase the volume of audio navigation instructions so that all audio navigation instructions are presented at a volume that is louder than the ambient noise as determined by ambient noise logic 226. In some implementations, navigation logic 202 will incrementally raise the volume of navigation instructions in response to determining that subsequent navigation instructions were missed. For example, each missed instruction will cause an incremental increase in volume until no further instructions are missed thereby insuring that the user can hear the navigational instructions.

In some implementations, when navigation logic 202 determines that a navigation instruction has been missed, navigation logic 202 can transmit the missed navigation instruction and the current location of navigation client 200 to the navigation server. The navigation server can calculate and transmit to the navigation client 200 a new route for reaching the previously specified destination. The navigation server can maintain a repository tracking missed navigation instructions, as described further below.

Figure 3:
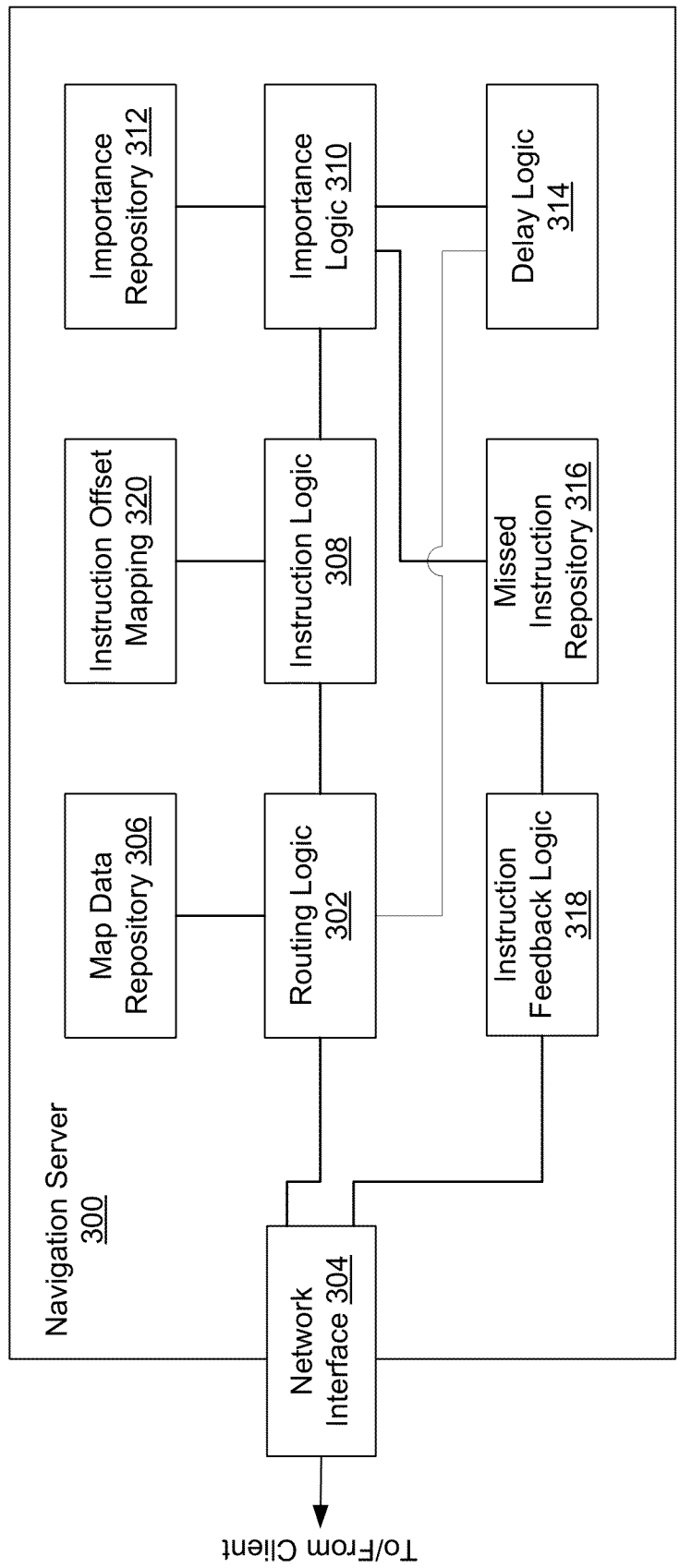
FIG. 3 illustrates an example navigation server for dynamic presentation of navigation instructions.

FIG. 3 illustrates an example navigation server 300 for dynamic presentation of navigation instructions. For example, navigation server 300 can correspond to navigation server 104 described above with reference to FIG. 1 and/or the navigation server referenced while describing FIG. 2. Navigation server 300 can be implemented as hardware, software, or a combination thereof. In some implementations, navigation server 300 can include routing logic 302 for determining route information for one or more routes between a start location and a destination location.

In some implementations, routing logic 302 can receive route parameters from a navigation client (e.g., navigation client 200) through network interface 304. For example, network interface 304 can provide a connection to the navigation client through a network (e.g., the internet). The route parameters can include a start location and an destination location for a calculating a route.

In some implementations, navigation server 300 can include map data repository 306. For example, map data repository 306 can include information describing locations and road segments between locations. Routing logic 302 can use the information in map data repository 306 to determine one or more routes between the received start and destination locations. For example, routing logic 302 can determine the road segments between the start location and the destination location that when combined (e.g., added together) result in the shortest distances between the start location and the destination location. Routing logic 302 can, for example, determine the three (or four or one, etc.) shortest routes between the start location and the destination location.

In some implementations, routing logic 302 can send the determined routes to instruction logic 308 to generate instructions for traversing the determined routes between the start location and the destination location. For example, instruction logic can generate text instructions for moving from one road segment (e.g., $1^{st}$ Street) to the next road segment (e.g., Shannon Way) along a route. If the route requires a left hand turn from $1^{st}$ Street onto Shannon Way, then instruction logic 308 can generate a text instruction that states "turn left onto Shannon Way." Instruction logic 308 can associate a generated instruction with a location (e.g., navigation location) along a route. For example, the instruction "turn left onto Shannon Way" can be associated with the location of the intersection of $1^{st}$ Street and Shannon Way.

In some implementations, instruction logic 308 can receive navigation instruction importance values from importance logic 310. For example, instruction logic 308 can send importance logic 310 the routes and instructions generated for the start location and the destination location received from the navigation client. Importance logic 310 can determine importance values for each navigation instruction associated with the routes.

In some implementations, importance logic 310 determines importance values for an instruction based on information stored in importance repository 312. For example, importance repository 312 can store predefined importance values for each instruction that may be generated for a route.

Importance repository 312 can include information describing importance values based on the type or category of navigation instruction. For example, importance repository 312 can store a mapping that indicates an importance value for operational instructions (e.g., instructions that require the user to perform a maneuver, turn, etc.). An example operational instruction is "turn right in 500 feet." Importance repository 312 can store a mapping that indicates an importance value for informational instructions (e.g., instructions that do not require a specific maneuver, turn, etc.) An example informational instruction could is "continue on Interstate 5." Importance repository 312 can store a mapping that indicates an importance value for unusual instructions (e.g., instructions pertaining to unusual road features). An example unusual instruction is "exit Highway 101 on the Left." Navigation instructions pertaining to an operational instruction and/or unusual instruction can be assigned a high importance value. Navigation instructions that are merely informational can be assigned a low importance value.

In some implementations, importance values for a navigation instruction can be determined dynamically based on the amount of travel delay (e.g., time and/or distance) incurred by the user if a particular instruction is missed. For example, importance logic 310 can provide the routes and instructions determined for navigating between the received start and destination location to delay logic 314. In some implementations, delay logic 314 can determine the amount of travel time added to the trip between the start location and the destination location if the user were to miss a navigation instruction. For example, delay logic 314 can analyze each instruction for a route and determine the shortest alternate route to reach the destination location if the instruction were missed by the user. For example, delay logic 314 can request a new or alternate route to the destination location from routing logic 302 that accounts for the missed instruction. Delay logic 314 can calculate the difference between the time needed to traverse (or distance of) the original route and the time needed to traverse (or distance of) the alternate route to determine the delay (e.g., time or distance) incurred by missing the instruction. The importance value for the instruction can be determined based on the magnitude of the delay incurred if the instruction were missed.

In some implementations, importance values for a navigation instruction can be determined based on whether the instruction is consistently or frequently missed by users. For example, when a navigation client (e.g., navigation client 200) determines that a user has missed a navigation instruction (as described above), the navigation client can transmit the missed instruction to navigation server 300. Instruction feedback logic 318 can receive the missed instruction from the navigation client and generate statistics (e.g., how often an instruction is missed, percent of the time an instruction is missed, how many times an instruction is missed) for the missed instruction in missed instruction repository 316. For example, missed instruction repository 316 can store missed instruction statistics for navigation instructions missed by different users using different devices. In some implementations, importance logic 310 can compare the navigation instructions associated with routes between the start location and destination location to the instructions in the missed instruction repository 316 to determine if any of the navigation instructions associated with the routes are frequently missed instructions. If a navigation instruction is identified as a frequently missed instruction (e.g., missed more than a threshold number of times, missed more than a threshold percentage of times, etc.), then the frequently missed instruction can be associated with a high importance value by importance logic 310. Once importance logic 310 has determined importance values for the navigation instructions associated with the routes provided by instruction logic 308, importance logic 310 can transmit the routes, instructions and importance values back to instruction logic 308.

In some implementations, instruction logic 308 can associate the instruction with a location offset from the navigation location. For example, a default location offset (e.g., 500 feet, ½ mile, etc.) can be assigned to a navigation instruction. In some implementations, the location offset can be determined based on the importance value of the instruction as determined by importance logic 310. For example, a navigation instruction with a high importance value can be associated with a larger in location offset (e.g., thereby providing an earlier notification to the user of an important turn). Navigation instructions with a low or nominal importance value can be associated with smaller location offset (e.g., the default location offset).

In some implementations, instruction logic 308 can obtain location offsets from an (e.g., predefined) offset mapping 320 of importance values to location offsets stored on navigation server 300. For example, instruction logic 308 can determine the location offset to associate with a navigation instruction by finding the location offset associated with the importance value of the instruction within offset mapping 320.

In some implementations, instruction logic 308 can associate multiple location offsets with a navigation instruction. For example, offset mapping 320 can associate multiple location offsets with an importance value. When instruction logic 308 finds multiple location offsets associated with an importance value, instruction logic 308 can associate each of the multiple location offsets with the navigation instruction. By associating the navigation instruction with multiple location offsets navigation server 300 can indicate to a navigation client that the corresponding instruction should be presented to the user multiple times and according to the locations determined from the location offsets.

In some implementations, instruction logic 308 can dynamically adjust instruction location offsets based on environmental and/or traffic conditions. In some implementations, instruction logic 308 can increase the location offset for navigation instructions based on the current weather conditions along a route. For example, instruction logic can obtain weather conditions from an internet weather service through network interface 304. In some implementations, instruction logic 308 can increase the location offset for navigation instructions based on traffic conditions along a route. For example, instruction logic 308 can obtain traffic condition (e.g., congestion, accidents, construction, etc.) information from an internet traffic service through network interface 304. By increasing the location offset for navigation instructions based on weather and/or traffic conditions, the navigation server can cause the navigation client to present the navigation instructions to the user early enough so that the user can navigate through traffic and weather conditions that might make traversing the route more difficult.

In some implementations, once instruction logic 308 has determined the navigation instructions, the importance values and the location offsets for the navigation instructions, instruction logic 308 can transmit the instructions, importance values and location offsets to routing logic 302. Routing logic 302 can then transmit the routes, navigation instructions, importance values and location offsets (e.g., routing information, collectively) to the navigation client (e.g., navigation client 200) for presentation to the user.

Example Processes

Figure 4A:
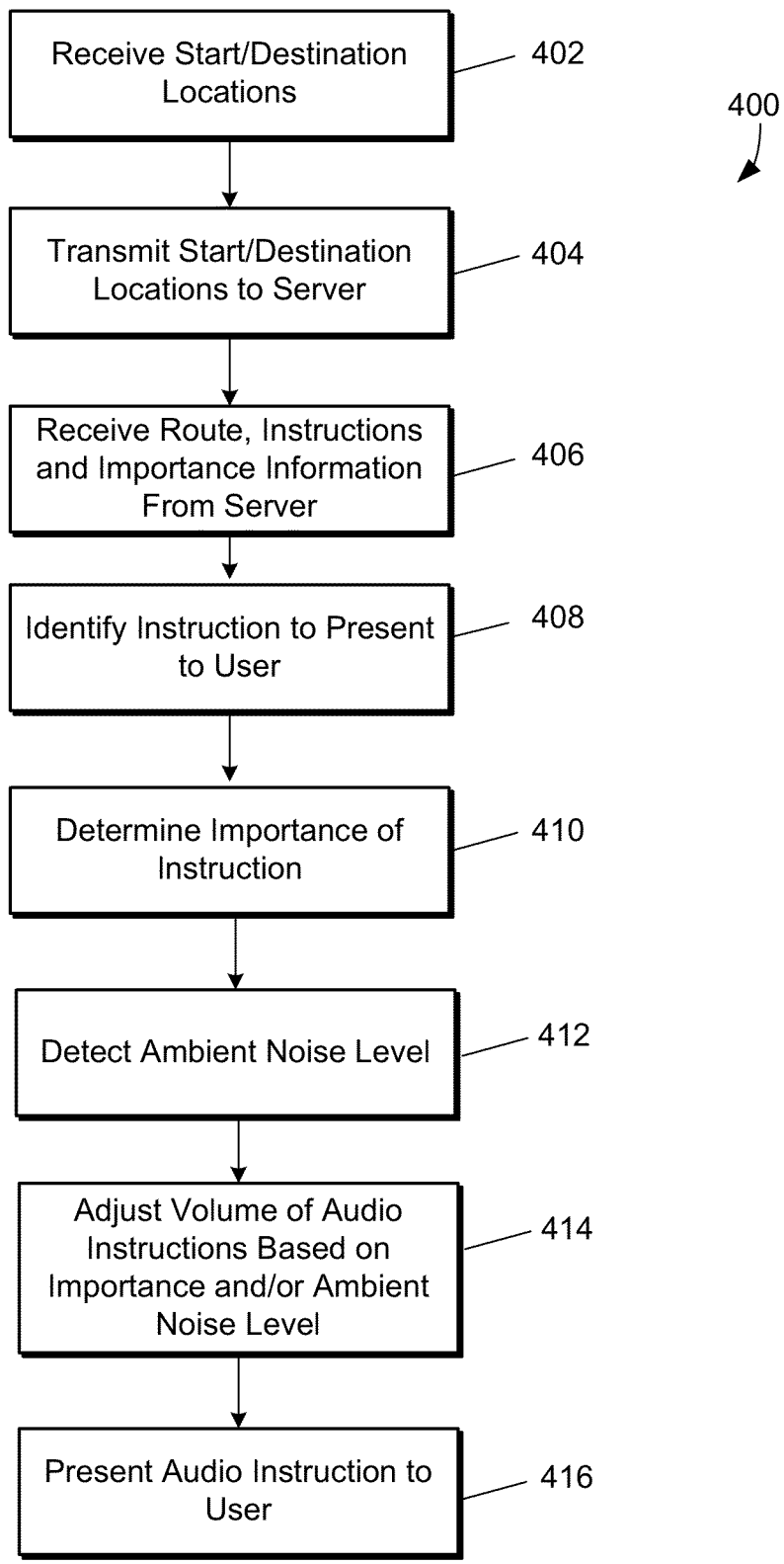
FIGS. 4A and 4B are a flow diagram of an example process for dynamically presenting navigation instructions.
Figure 4B:
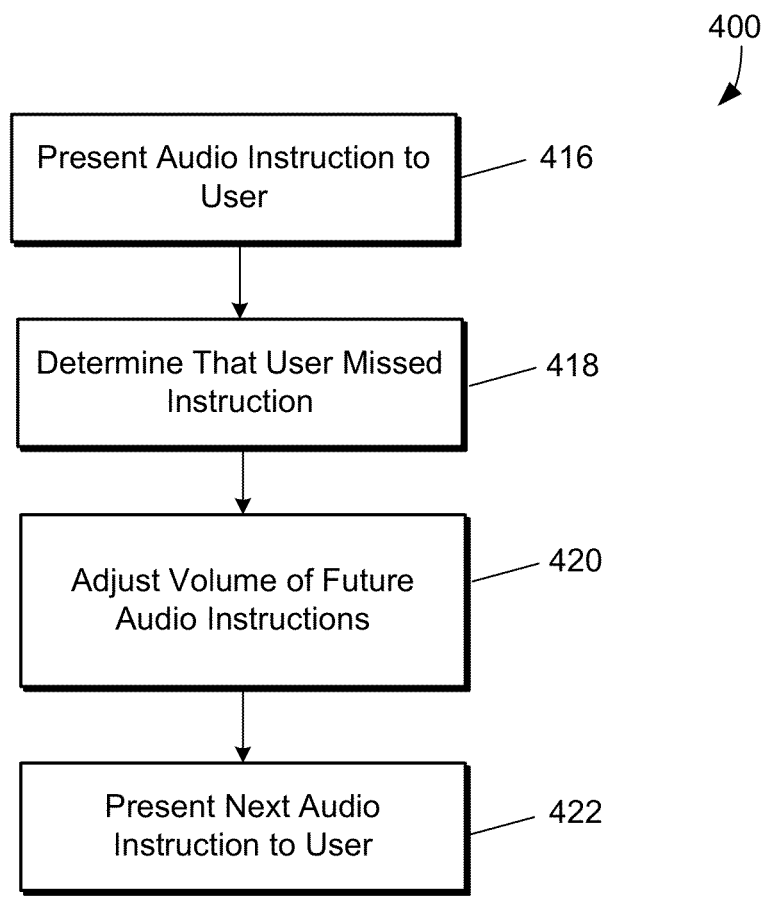

FIGS. 4A and 4B illustrate a flow diagram of an example process 400 for dynamically presenting navigation instructions. Process 400 can be performed by a client device (e.g., navigation client 200), for example. At step 402, the client device can receive a start location and a destination location from a user. For example, the user can specify start and destination locations by providing input to a graphical user interface of a navigation application of the client device.

At step 404, the client device can transmit the start and destination locations to a navigation server. For example, the client device can transmit the start and destination locations to navigation server 300 of FIG. 3.

At step 406, the client device can receive route information including routes, navigation instructions and instruction importance information from the navigation server. For example, each navigation instruction can be a textual instruction associated with a location along a route. The navigation instructions can be associated with a location offset indicating when or where the navigation instruction should be presented to the user. The importance information can be a value (e.g., 1-10, high, medium, low, etc.) indicating how important the instruction is to accurately traversing the route. For example, if the user misses an important instruction, it may take longer for the user to navigate the route.

At step 408, the client device can identify an instruction to present to the user. For example, the user can select a route from the routes provided by the navigation server to begin traversing the route. The client device can determine the current location of the client device, and compare the current location of the client device to route information that associates navigation instructions with locations along the selected route. Based on the comparison, the client device can determine which navigation instruction should be presented next. The client device can present the navigation instruction at a location along the route determined based on the instruction location and the location offset, as described above.

At step 410, the client device can determine the importance of the navigation instruction. For example, once the next navigation instruction is determined, the client device can determine the importance value of the navigation instruction based on the route information received from the navigation server. The client can determine the navigation server determined importance value associated with the next instruction.

At step 412, the client device can detect the ambient noise level at the client device. For example, if the user is operating the client device in a car and playing music, talking, etc., the client device can determine the loudness of the noise generated by playing the music, talking, etc. For example, the client device can generate a loudness metric (e.g., value) that indicates how loud the ambient noise is.

At step 414, the client device can adjust the volume of audio instructions based on the importance of the instruction and/or the ambient noise level. For example, the client device can raise the output volume of audio navigation instructions (e.g., from a default volume) so that the audio instructions are presented at a volume that is louder than the loudness of the ambient noise. In some implementations, only important instructions (e.g., instructions with an importance value over a threshold value) are presented at an increased volume. For example, the client device can raise the output volume of only important audio navigation instructions (e.g., from a default volume) so that the audio instructions are presented at a volume that is louder than the loudness of the ambient noise. Instructions that do not have an importance value that exceeds the threshold value can be presented at the default volume level.

At step 416, the audio instructions can be presented to the user. For example, textual navigation instructions received from the navigation server can by synthesized into audio speech and played through a speaker of the client device at a volume determined at step 414.

At step 418 of FIG. 4B, the client device can determine that the user missed a navigation instruction. For example, the client device can determine that the user missed a navigation instruction by determining that the user is no longer travelling along the route selected by the user (e.g., the current location of the client device is not a location associated with the selected route). In some implementations, the client device can report the missed navigation instruction to the navigation server and request a new or alternate route to the destination location.

At step 420, the client device can adjust the volume of future audio instructions in response to determining that the user has missed an instruction. For example, the client device can adjust the volume of all future instructions so that the instructions can be heard over the ambient noise detected by the client device. In some implementations, the client device can incrementally increase the volume of navigation instructions in response to detecting or determining additional missed instructions. For example, an instruction can be initially presented at a default volume. If the instruction is missed, the default volume for future instructions can be raised by an incremental amount. The default volume can continue to be raised in response to detecting each additional missed instruction until the user stops missing the navigation instructions. Once the user resumes following the navigation instructions (e.g., adheres to the prescribed route), the default volume for audio navigation instructions can be returned to the original or starting default volume.

At step 422, the client device can present the next audio instruction to the user. For example, the client device can determine which audio instruction should be presented next and present the next audio instruction to the user at the increased volume level.

Figure 5:
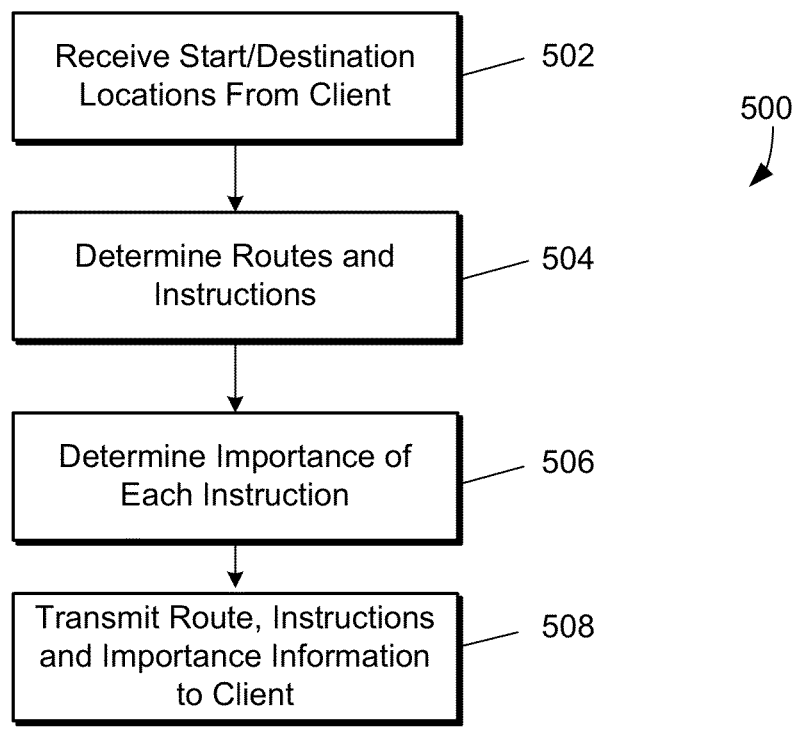
FIG. 5 is a flow diagram of an example process for dynamically presenting navigation instructions.

FIG. 5 is a flow diagram of an example process 500 for dynamically presenting navigation instructions. Process 500 can be performed by a server device (e.g., navigation server 300), for example. At step 502, the server device can receive start and destination locations from a client device. For example, the server device can receive start and destination locations from navigation client 200 of FIG. 2.

At step 504, the server device can determine routes and instructions for navigating between the start location and the destination location. For example, the server device can identify road segments that can be combined to produce the shortest routes between the start location and the destination location. The server device can then generate instructions for navigating from one road segment to another road segment along the routes, as described above with respect to FIG. 3.

At step 506, the server device can determine the importance of each navigation instruction. For example, the importance of each navigation instruction can be determined based on predefined importance values, the calculated delay incurred if the user were to miss an instruction and/or how often a particular instruction is missed, as described in detail with reference to FIG. 3.

At step 508, the server device can transmit the route information (e.g., routes, navigation instructions and importance values) to the client device. For example, the server device can transmit the route information to the client device so that the user can select a route and receive navigation instructions (e.g., audio, text, graphical instructions, etc.) from the client device.

Example System Architecture

Figure 6:
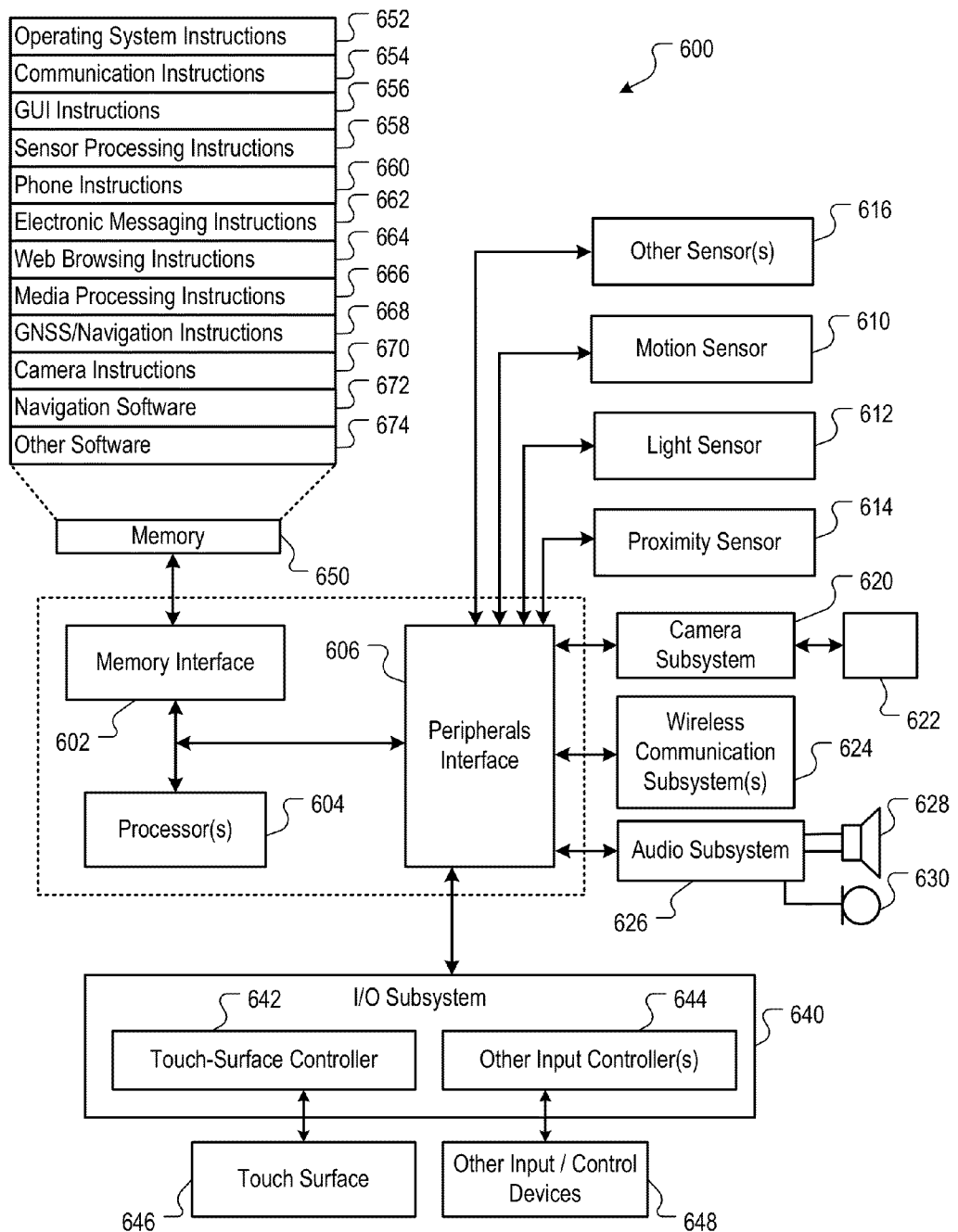
FIG. 6 is a block diagram of an example computing device that can implement the features and processes of FIGS. 1-5.

FIG. 6 is a block diagram of an example computing device 600 that can implement the features and processes of FIGS. 1-5. For example, computing device 600 can correspond to navigation client 200 of FIG. 2 and/or navigation server 300 of FIG. 3. The computing device 600 can include a memory interface 602, one or more data processors, image processors and/or central processing units 604, and a peripherals interface 606. The memory interface 602, the one or more processors 604 and/or the peripherals interface 606 can be separate components or can be integrated in one or more integrated circuits. The various components in the computing device 600 can be coupled by one or more communication buses or signal lines.

Sensors, devices, and subsystems can be coupled to the peripherals interface 606 to facilitate multiple functionalities. For example, a motion sensor 610, a light sensor 612, and a proximity sensor 614 can be coupled to the peripherals interface 606 to facilitate orientation, lighting, and proximity functions. Other sensors 616 can also be connected to the peripherals interface 606, such as a global navigation satellite system (GNSS) (e.g., GPS receiver), a temperature sensor, a biometric sensor, magnetometer or other sensing device, to facilitate related functionalities.

A camera subsystem 620 and an optical sensor 622, e.g., a charged coupled device (CCD) or a complementary metal-oxide semiconductor (CMOS) optical sensor, can be utilized to facilitate camera functions, such as recording photographs and video clips. The camera subsystem 620 and the optical sensor 622 can be used to collect images of a user to be used during authentication of a user, e.g., by performing facial recognition analysis.

Communication functions can be facilitated through one or more wireless communication subsystems 624, which can include radio frequency receivers and transmitters and/or optical (e.g., infrared) receivers and transmitters. The specific design and implementation of the communication subsystem 624 can depend on the communication network(s) over which the computing device 600 is intended to operate. For example, the computing device 600 can include communication subsystems 624 designed to operate over a GSM network, a GPRS network, an EDGE network, a Wi-Fi or WiMax network, and a Bluetooth™ network. In particular, the wireless communication subsystems 624 can include hosting protocols such that the device 100 can be configured as a base station for other wireless devices.

An audio subsystem 626 can be coupled to a speaker 628 and a microphone 630 to facilitate voice-enabled functions, such as speaker recognition, voice replication, digital recording, and telephony functions. The audio subsystem 626 can be configured to facilitate processing voice commands, and voice authentication, for example.

The I/O subsystem 640 can include a touch-surface controller 642 and/or other input controller(s) 644. The touch-surface controller 642 can be coupled to a touch surface 646. The touch surface 646 and touch-surface controller 642 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 646.

The other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of the speaker 628 and/or the microphone 630.

In one implementation, a pressing of the button for a first duration can disengage a lock of the touch surface 646; and a pressing of the button for a second duration that is longer than the first duration can turn power to the computing device 600 on or off. Pressing the button for a third duration can activate a voice control, or voice command, module that enables the user to speak commands into the microphone 630 to cause the device to execute the spoken command. The user can customize a functionality of one or more of the buttons. The touch surface 646 can, for example, also be used to implement virtual or soft buttons and/or a keyboard.

In some implementations, the computing device 600 can present recorded audio and/or video files, such as MP3, AAC, and MPEG files. In some implementations, the computing device 600 can include the functionality of an MP3 player, such as an iPod™. The computing device 600 can, therefore, include a 36-pin connector that is compatible with the iPod. Other input/output and control devices can also be used.

The memory interface 602 can be coupled to memory 650. The memory 650 can include high-speed random access memory and/or non-volatile memory, such as one or more magnetic disk storage devices, one or more optical storage devices, and/or flash memory (e.g., NAND, NOR). The memory 650 can store an operating system 652, such as Darwin, RTXC, LINUX, UNIX, OS X, WINDOWS, or an embedded operating system such as VxWorks.

The operating system 652 can include instructions for handling basic system services and for performing hardware dependent tasks. In some implementations, the operating system 652 can be a kernel (e.g., UNIX kernel). In some implementations, the operating system 652 can include instructions for performing operations and functions enabling the dynamic presentation of navigation instructions. For example, operating system 652 can implement the navigation instruction presentation features as described with reference to FIGS. 1-5.

The memory 650 can also store communication instructions 654 to facilitate communicating with one or more additional devices, one or more computers and/or one or more servers. The memory 650 can include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GNSS/Navigation instructions 668 to facilitate GNSS and navigation-related processes and instructions; and/or camera instructions 670 to facilitate camera-related processes and functions.

The memory 650 can store other software instructions 672 to facilitate other processes and functions, such as the navigation instruction presentation processes and functions as described with reference to FIGS. 1-5.

The memory 650 can also store other software instructions 674, such as web video instructions to facilitate web video-related processes and functions; and/or web shopping instructions to facilitate web shopping-related processes and functions. In some implementations, the media processing instructions 666 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 650 can include additional instructions or fewer instructions. Furthermore, various functions of the computing device 600 can be implemented in hardware and/or in software, including in one or more signal processing and/or application specific integrated circuits.

What is claimed is:

1. A method comprising:
   receiving, at a mobile device, a route for traveling from a first location to a second location;
   receiving instructions for navigating the route, each instruction having an associated importance value;
   determining a first instruction to present to a user associated with the mobile device;
   determining whether an importance value associated with the first instruction exceeds a predetermined threshold value;
   based on determining that the importance value associated with the first instruction exceeds the predetermined threshold value, determining a first volume level for presenting the first instruction; and
   causing the first instruction to be presented to the user as audio at the first volume level.

2. The method of claim 1, further comprising:
   determining a second instruction to present to the user; and
   causing the second instruction to be presented to the user as audio at a second volume level, the second volume level determined based on the importance value associated with the second instruction,
   where the first volume level is different than the second volume level.

3. The method of claim 1, further comprising:
   detecting ambient noise proximate to the mobile device;
   determining a loudness of the ambient noise; and
   determining the first volume level based on the loudness of the ambient noise, where the loudness of the audio presented at the first volume level is greater than the loudness of the ambient noise.

4. The method of claim 1, wherein the importance value is based on how frequently the first instruction is missed by users travelling along the route.

5. The method of claim 1, wherein the importance value is based on an amount of travel time that would be added to the route if the user were to miss the first instruction.

6. The method of claim 1, wherein the importance value is based on whether the first instruction corresponds to an unusual road condition.

7. The method of claim 2, further comprising:
   determining that the user missed the second instruction, where the second instruction was presented at a default volume level; and
   increasing the default volume at which subsequent audio instructions are presented based on the determination that the user missed the second instruction.

8. A non-transitory computer-readable medium including one or more sequences of instructions which, when executed by one or more processors, causes:
   receiving, at a mobile device, a route for traveling from a first location to a second location;
   receiving instructions for navigating the route, each instruction having an associated importance value;
   determining a first instruction to present to a user associated with the mobile device;
   determining whether an importance value associated with the first instruction exceeds a predetermined threshold value;
   based on determining that the importance value associated with the first instruction exceeds the predetermined threshold value, determining a first volume level for presenting the first instruction; and
   causing the first instruction to be presented to the user as audio at the first volume level.

9. The non-transitory computer-readable medium of claim 8, where the instructions cause:
   determining a second instruction to present to the user; and
   causing the second instruction to be presented to the user as audio at a second volume level, the second volume level determined based on the importance value associated with the second instruction,
   where the first volume level is different than the second volume level.

10. The non-transitory computer-readable medium of claim 8, where the instructions cause:
    detecting ambient noise proximate to the mobile device;
    determining a loudness of the ambient noise; and determining the first volume level based on the loudness of the ambient noise, where the loudness of the audio presented at the first volume level is greater than the loudness of the ambient noise.

11. The non-transitory computer-readable medium of claim 8, wherein the importance value is based on how frequently the first instruction is missed by users travelling along the route.

12. The non-transitory computer-readable medium of claim 8, wherein the importance value is based on an amount of travel time that would be added to the route if the user were to miss the first instruction.

13. The non-transitory computer-readable medium of claim 8, wherein the importance value is based on whether the first instruction corresponds to an unusual road condition.

14. The non-transitory computer-readable medium of claim 9, wherein the instructions cause:
determining that the user missed the second instruction, where the second instruction was presented at a default volume level; and
increasing the default volume at which subsequent audio instructions are presented based on the determination that the user missed the second instruction.

15. A system comprising:
one or more processors; and
a computer-readable medium including one or more sequences of instructions which, when executed by the one or more processors, causes:
receiving, at a mobile device, a route for traveling from a first location to a second location;
receiving instructions for navigating the route, each instruction having an associated importance value;
determining a first instruction to present to a user associated with the mobile device;
determining whether an importance value associated with the first instruction exceeds a predetermined threshold value;
based on determining that the importance value associated with the first instruction exceeds the predetermined threshold value, determining a first volume level for presenting the first instruction; and
causing the first instruction to be presented to the user as audio at the first volume level.

16. The system of claim 15, where the instructions cause:
determining a second instruction to present to the user; and
causing the second instruction to be presented to the user as audio at a second volume level, the second volume level determined based on the importance value associated with the second instruction,
where the first volume level is different than the second volume level.

17. The system of claim 15, where the instructions cause:
detecting ambient noise proximate to the mobile device;
determining a loudness of the ambient noise; and
determining the first volume level based on the loudness of the ambient noise, where the loudness of the audio presented at the first volume level is greater than the loudness of the ambient noise.

18. The system of claim 15, wherein the importance value is based on how frequently the first instruction is missed by users travelling along the route.

19. The system of claim 15, wherein the importance value is based on an amount of travel time that would be added to the route if the user were to miss the first instruction.

20. The system of claim 15, wherein the importance value is based on whether the first instruction corresponds to an unusual road condition.

21. The system of claim 16, wherein the instructions cause:
determining that the user missed the second instruction, where the second instruction was presented at a default volume level; and
increasing the default volume at which subsequent audio instructions are presented based on the determination that the user missed the second instruction.

* * * * *

UNITED STATES PATENT AND TRADEMARK OFFICE
CERTIFICATE OF CORRECTION

| | |
|---|---|
| PATENT NO. | : 8,862,387 B2 |
| APPLICATION NO. | : 13/736741 |
| DATED | : October 14, 2014 |
| INVENTOR(S) | : Anil K. Kandangath and Xiaoyuan Tu |

It is certified that error appears in the above-identified patent and that said Letters Patent is hereby corrected as shown below:

Title page, column 2, line 5, item (57) under "ABSTRACT", delete "based" and insert -- based on --, therefor.

Signed and Sealed this
Seventeenth Day of February, 2015

Michelle K. Lee
*Deputy Director of the United States Patent and Trademark Office*